Dec. 3, 1963  B. L. SNAVELY  3,113,288
SUPERSENSITIVE SHIELDED CRYSTAL HYDROPHONE
Filed Oct. 21, 1960  2 Sheets-Sheet 1

INVENTOR.
B. L. SNAVELY
BY W. O. Quesenberry
O. Hodges
R. M. Hicks  ATTYS.

United States Patent Office 3,113,288
Patented Dec. 3, 1963

3,113,288
SUPERSENSITIVE SHIELDED CRYSTAL
HYDROPHONE
Benjamin L. Snavely, Silver Spring, Md., assignor to the United States of America as represented by the Secretary of the Navy
Filed Oct. 21, 1960, Ser. No. 64,227
10 Claims. (Cl. 340—10)
(Granted under Title 35, U.S. Code (1952), sec. 266)

The invention described herein may be manufactured and used by or for the Government of the United States of America for governmental purposes without the payment of any royalties thereon or therefor.

This invention relates to hydrophones and more particularly to a supersensitive shielded hydrophone for generating electrical signals which are independent of the instantaneous potential of the water within which the hydrophone is submerged and are unaffected by variations in potential of the water.

It has been the usual practice heretofore to employ microphones for underwater use in the detection and measurement of signals for various underwater purposes in which the microphone is connected by a submarine cable to a preamplifier at a receiving station. According to other uses the hydrophones are arranged within the water in an array which may comprise two or more hydrophones in mutually spaced relation. These hydrophones may be either secured to the bed of the body of water within which they are submerged or, if desired, mounted in mutually spaced relation upon a submarine and employed to obtain a measure of the direction of the sound source relative thereto or, if desired, the range of such a source of sound. Such devices have not been entirely satisfactory under all the conditions of service for the reason that a potential difference in the water at the site of each microphone relative to the other microphones may cause spurious signals to be received from the microphones due to the stray capacity between the microphone elements and the adjacent water. This problem assumes serious proportions when the potential of the water at the microphone is varying in character.

The device of the present invention possesses all of the advantages of the prior art devices of this type and none of the foregoing disadvantages.

In accordance with the present invention this desirable object is achieved by effectively shielding the sensitive hydrophone element in a manner to prevent electromagnetic coupling from the water to the active crystal element of the hydrophone due to the stray capacity between the element and the adjacent water, as will more clearly appear as the description proceeds. By this arrangement potential variations which exist within the water at the hydrophone sites are rendered ineffective to modulate the output signals from the hydrophones. This is of particular advantage in recording simultaneous signals from an array of hydrophones. When the present invention is employed, the ground from each channel may be connected to the water at a common point without adverse effects.

Furthermore, the present invention contemplates the provision of a balanced type hydrophone in which the unit area pressure against the crystal elements greatly exceeds the unit pressure of the water at the interface of the hydrophone element in contact therewith whereby the hydrophone is supersensitive in character and adapted to respond satisfactorily to signals within the water which are sufficiently weak as to be undetectable by the conventional type of microphone of equal size.

One of the objects of the present invention is to provide a new and improved hydrophone for use with detection and measurement apparatus.

Another of the objects is to provide a hydrophone in which means are employed to prevent electromagnetic coupling from the water to the active crystal element of the hydrophone.

Still another object is to provide a hydrophone having new and improved means for preventing stray capacity between the hydrophone element and the adjacent water.

Still other objects, advantages and improvements will be apparent from the following description taken in connection with the accompanying drawings of which:

Figure 1:
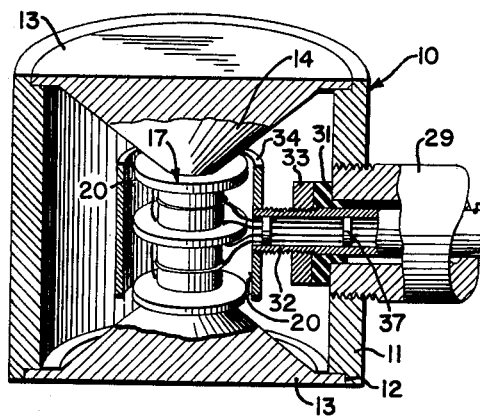
FIG. 1 is a view in section and partially broken away of the hydrophone of the instant invention on which is shown the shielding element and means for connecting a cable thereto.

Referring now to the drawings for a more complete understanding of the invention and more particularly to FIG. 1 thereof there is shown thereon a hydrophone indicated generally by the numeral 10 comprising a cylindrical casing 11 recessed as at 12 to receive a pair of flexible diaphragm members 13 in snug press-fitted engagement therewith. Diaphragm members 13 each has a rigid frusto-conical portion 14 formed thereon encircled by an annular flexible portion and a flat surface 15 contiguous therewith of much smaller area than the area of the outside surface of the diaphragm, a ratio of the areas of the two surfaces being such that the unit pressure applied to the crystal element by surface 15 exceeds the pressure per unit area applied by the water to the outer surface of the microphone by a predetermined factor, a ratio of 20 to 1 having been found satisfactory. The diaphragm members 13 are composed of brass, aluminum, or other metal suitable for the purpose.

Figure 5:
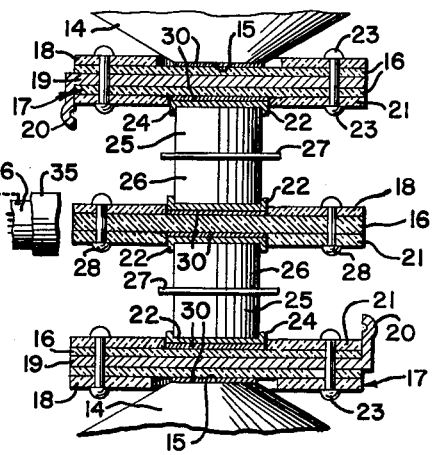
FIG. 5 is a fragmentary view in section and somewhat enlarged of the crystal elements and supporting means therefor.
Figure 2:
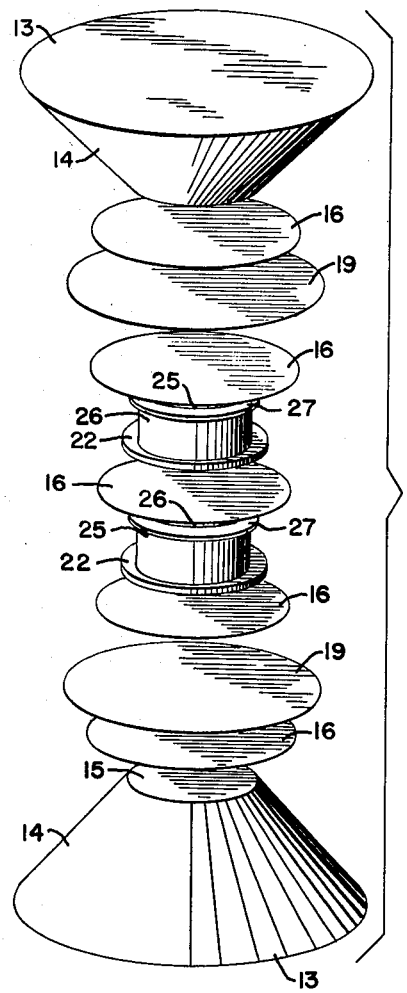
FIG. 2 is an enlarged diagrammatic view of the vibrating parts of the shielded microphone of FIG. 1.

As more clearly shown on FIG. 5, the surface 15 of the frusto-conical portion of the diaphragm is in abutting relation with a mica disc 16 forming part of an assembly designated generally by the numeral 17. The details of this assembly will now be described.

The assembly comprises a mica disc 18 of annular configuration, the opening therein being of sufficient size to engage the conical element 14 substantially as shown and prevent lateral movement of the assembly when in the assembled position between the conical elements of the two diaphragms. The mica disc 16 is in abutting engagement with a thin metallic disc 19 on the opposite side of which is clamped another mica disc 16. At least one tab 20 is formed on the disc 19. The opposite side of the second disc 16 is in abutting engagement with a mica disc 21 having an aperture centrally located therein of circular configuration and sufficient size to receive a brass end cap 22 and prevent lateral movement of the end cap with respect thereto. The parts comprising the assembly 17 are assembled in the order named and maintained in clamped relation with each other by a plurality of rivets 23 substantially as shown. The cap 22 is comprised preferably of spun brass having a thickness of substantially six thousandths of an inch and provided with a flanged portion 24 for receiving and positioning one face of a circular crystal element 25.

The crystal elements are preferably composed of barium titanate although, if desired, ammonium dihydrogen sulfate or Rochelle salt may be employed, the ammonium dihydrogen sulfate crystals being Z-cut and the Rochelle salt crystals being X-cut. Adjacent crystal 25 is arranged another crystal 26 assembled in back-to-back relation therewith. The crystals 25 and 26 are cemented to a thin strip of silver foil 27 having a thickness preferably of 1 mil by a suitable adhesive in which a quantity of powdered silver has been mixed to insure a good electrical contact between the faces of the crystals and the foil.

Figure 3:
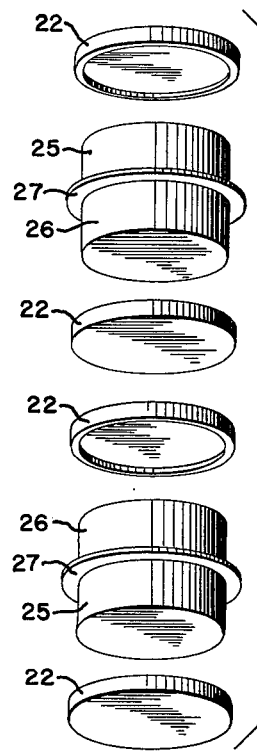
FIG. 3 is an exploded view in perspective of the pressure sensitive elements and the caps for making contact with the end electrodes of each element.

The opposite face of crystal 26 is provided with a cup 22 into which it is snugly fitted. The last-named cup fits into a mica disc 18 secured to a mica disc 16 and another disc 21 in the order named by a plurality of rivets 28. In like manner, the lower pair of crystal elements 25, 26, as viewed on the drawing, are assembled with the lower assembly 17 and the frusto-conical portion of the lower diaphragm 13 in such manner that the crystals are securely maintained in the assembled position and supported by the diaphragms when the diaphragms 13 are press-fitted within the hydrophone casing 11. It has been found desirable to apply a thin coating of silicon grease designated by the numeral 30 to the surface 15 of each of the diaphragms and to the outer flat surface of the caps 22 adjacent thereto for insuring a high degree of efficient transmission of pressure from the diaphragms to the crystal elements. The center electrode 27 is composed of silver foil of 1 mil thickness and the discs are bonded together using a suitable adhesive mixed with sufficient silver powder to insure a good electrical contact therebetween. A pair of electrode caps 22, FIG. 3, are employed to make contact with the end electrodes of each crystal element, the caps being preferably spun from thin brass sheets having a thickness of 6 mils. When the crystals are assembled as shown in FIG. 1, they are tightly compressed between the pair of diaphragm members 13 and responsive to vibrations received therefrom.

A cylindrical shield 34, FIG. 1, composed of metal encircles the crystal elements of the hydrophone. The shield has an inside diameter slightly larger than the diameter of the metallic discs 19 of the assemblies 17 whereby the metallic discs substantially close the ends of the cylindrical shield 34 to provide an electrostatic shield forming a shielded chamber about the crystal elements and the wires extending therefrom as to render the device insensitive to variations in the potential of the water within which the hydrophone is immersed. The shield 34 is in close proximity to but not touching the circular metallic discs 19 except at tabs 20 whereby a maximum amount of shielding of the crystal elements is obtained.

The casing 11 is provided with a tapped hole in the side thereof within which is threaded a tubular support 29, the support having an insulating bushing 31 snugly fitted therein and threaded on a rigid metallic tubular conductor shield 32, a lock nut 33 being provided to maintain the bushing 31 secured thereto in predetermined fixed position. The cylindrical shield member 34 is secured to and supported by the conductor shield 32 in any suitable manner as by threading the parts together.

An arrangement is thus provided in which the cylindrical shield member 34 is fixedly supported by the casing 11 of the hydrophone and insulated therefrom and the crystal elements and discs 19 enclosing the ends of shield member 34 are supported by and insulated from the pair of oppositely disposed diaphragms 13. As shown diagrammatically on FIG. 1, the tubular conductor shield is electrically connected to the flexible shield 36 within cable 35, which in turn may be connected to the preamplifier ground. The crystal elements are connected in a well known manner substantially as shown whereby a balanced output therefrom is obtained.

In this arrangement the polarization of the sensitive elements is such that a compressive force applied thereto causes an accumulation of positive charge at one foil electrode and simultaneously therewith an accumulation of negative charge at the other foil electrode. Each of these electrodes is adapted to be connected to a grid in a balanced input preamplifier. The source capacity for each element is substantially 530 micromicrofarads. In the arrangement disclosed the calculated sensitivity of the hydrophone is −71 dbv per dyne per square centimeter, and the resonant frequency [assumed to be controlled by the mass of the pressure multiplying cones and the stiffness of the sensitive elements] was calculated to be 8.1 kilocycles per second.

The four leads from the crystal hydrophone elements are connected to four conductors within the submarine cable 35, the cable being connected by a gland, not shown, of any type suitable for the purpose, to the support 29 in a manner to exclude water from the interior of the hydrophone and the support 29 therefor. If desired, a coating of waterproof cement may be applied to the exterior of the hydrophone as required to prevent seepage of water therein. A plurality of insulating spacing elements 37 are provided to maintain the conductors in proper spaced relation within the shield 32. An arrangement has thus been provided in which the sensitive hydrophone elements and wiring thereto are effectively shielded from stray capacity effects and in which the shield is isolated electrically from the water whereby variations in potential of the water which may exist at the hydrophone sites comprising an array or between the hydrophone and the receiving stations in systems employing but a single hydrophone, are prevented from modulating the hydrophone signals.

Figure 4:
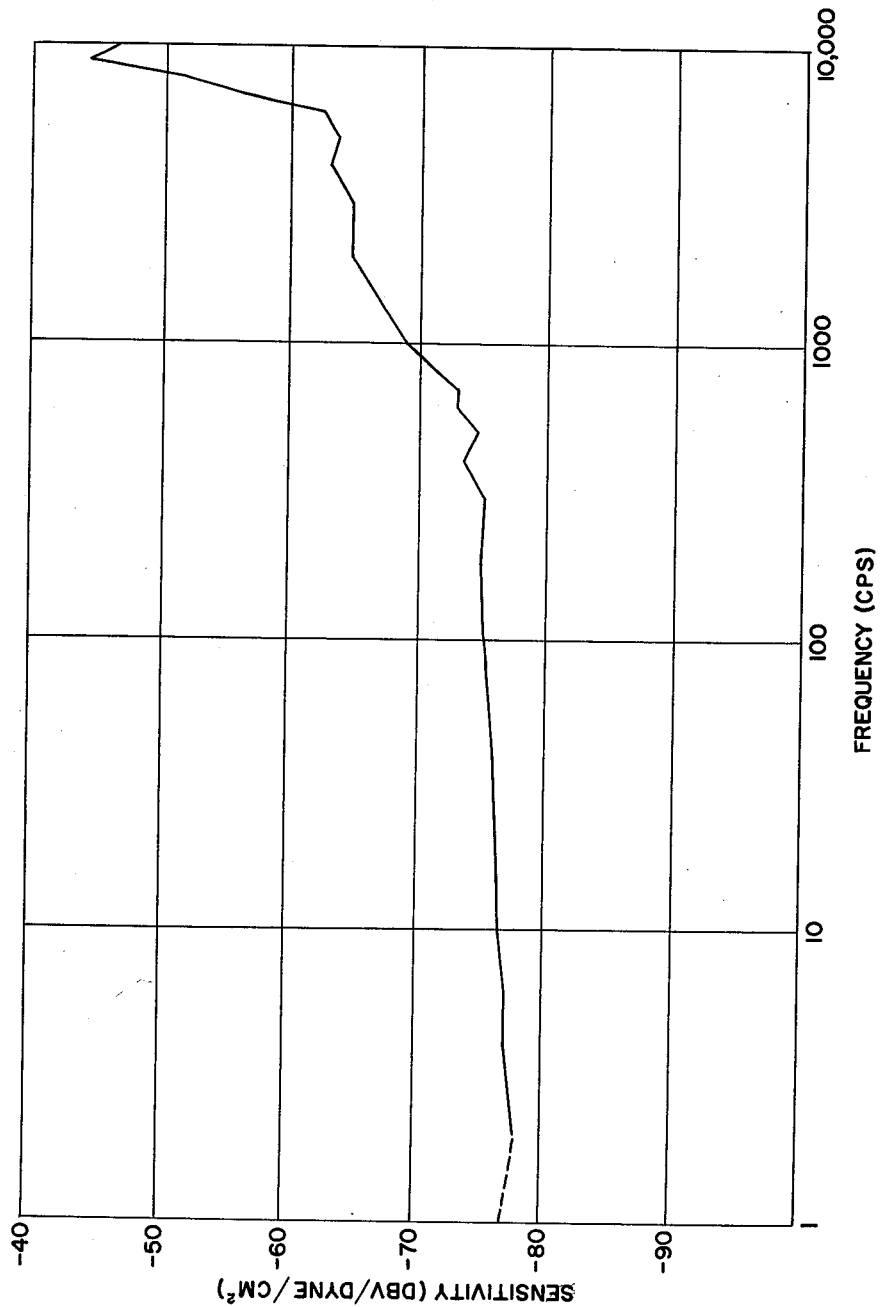
FIG. 4 is a graph illustrating the sensitivity of the shielded hydrophone over a range of frequencies.

On FIG. 4 is shown a graph on a logarithmic scale illustrating the frequency range between one cycle per second and ten kilocycles per second of signals with respect to the open-circuit sensitivity of the hydrophone. Measurements made on the hydrophone of the instant invention have shown that the response of the hydrophone is not sensitive to the direction of the sound for frequencies below one kilocycle per second. It will also be noted that the frequency-response of the hydrophone is substantially flat for frequencies from 1 cycle per second to 500 cycles per second and that at higher frequencies the sensitivity appears to rise at about six decibels per octave, beginning at about 500 cycles per second.

Although only one preferred embodiment of this invention has been shown in detail, many variations and modifications can be made without departing from the spirit and scope thereof. Accordingly, this invention is to be limited only by the scope of the appended claims.

What is claimed as new and desired to be secured by Letters Patent of the United States is:

1. A balanced hydrophone for detecting underwater signals and generating electrical signals corresponding thereto comprising a hollow cylindrical open ended metallic casing having an aperture in the side wall thereof, a pair of flexible metallic diaphragm elements secured to opposite ends of said casing in watertight relation therewith, a stack of piezo-electric elements carried by and tightly fitted between said diaphragm elements and insulated therefrom, a hollow support threadedly secured to the casing at said aperture in watertight relation therewith, a rigid tubular metallic shield disposed within said support and insulated therefrom, said support having a plurality of conductors therein for establishing an external electrical connection to said piezo-electric elements, a hollow cylindrical electrostatic shield member fixedly carried by said tubular shield in coaxial spaced relation with and encircling said stack of piezo-electric elements, a pair of circular metallic disc members clamped between said stack of piezo-electric elements and said diaphragms respectively, each of said disc members having at least one metallic tab thereon for slideably engaging an inner surface of said shield member, said disc members substantially enclosing but not touching the end portions of said electrical shield member except at said tabs, and means insulating said disc members from said diaphragm and from said crystal stack.

2. A hydrophone according to claim 1 including a submarine cable in watertight connection with said hollow support, a plurality of wires within said cable to which said first plurality of conductors are respectively connected, and a flexible electrical shielding element formed interiorly within said cable throughout the length thereof within which said wires are disposed, said shielding element being electrically connected to said rigid tubular shield.

3. A supersensitive crystal hydrophone comprising a metallic casing, a stack of piezo-electric crystal elements arranged within said casing, flexible diaphragm means secured to said casing and supporting said elements in a manner to apply pressure thereto variably in accordance with signals received thereby through the water within which the hydrophone is immersed, an electrostatic shield within said casing and carried thereby, said shield enclosing said crystal elements, means insulating said shield from said casing, and means including a submarine cable for providing a plurality of external electrical connections to said crystal elements and to said shield.

4. A hydrophone according to claim 3 in which said diaphragm means comprises a pair of flexible metallic diaphragm members, each of said members having a rigid frusto-conical element formed centrally therewith, the elements being arranged in mutually opposing spaced relation thereby to support and apply pressure variably to said crystal elements as signals are received through the water.

5. A hydrophone according to claim 4 including a plurality of discs composed of mica and disposed between said crystal elements and diaphragm members for insulating said crystal elements from said diaphragm members.

6. A hydrophone according to claim 5 including a plurality of additional annular members secured to said discs for receiving the end portion of said frusto-conical members and said crystal elements and maintaining an aligned relation therebetween.

7. A hydrophone according to claim 4 in which said electrostatic shield comprises a hollow cylindrical metallic shielding member carried by said casing in electrical insulated relation therewith and a pair of closely fitting metallic discs carried by said frusto-conical elements, each of said discs having a tab formed thereon in a manner to slideably engage said inner surface of said cylindrical member and movable within said cylindrical member but not in contact therewith except at said tabs.

8. A hydrophone according to claim 7 including a plurality of metallic cup members, each fitted to an end portion of each element of said crystal stack for establishing an electrical connection thereto.

9. A hydrophone according to claim 8 including means interconnecting the piezo-electric elements of said stack in a manner to obtain a balanced output therefrom.

10. A hydrophone according to claim 8 including a thin coating of silicon grease on the outer transverse surface of said metallic cup members thereby to increase the efficiency of transmission of pressure impulses from the diaphragms to the piezo-electric elements.

References Cited in the file of this patent

UNITED STATES PATENTS

| | | |
|---|---|---|
| 2,605,346 | Gogolick et al. | July 29, 1952 |
| 2,962,695 | Harris | Nov. 29, 1960 |
| 2,967,957 | Massa | Jan. 10, 1961 |